(12) United States Patent
Addison

(10) Patent No.: US 7,568,256 B1
(45) Date of Patent: Aug. 4, 2009

(54) HEATED WINDSHIELD WIPER APPARATUS

(76) Inventor: Dennis Addison, 2-1 Granada Crescent, White Plains, NY (US) 10603

( * ) Notice: Subject to any disclaimer, the term of this patent is extended or adjusted under 35 U.S.C. 154(b) by 395 days.

(21) Appl. No.: 11/619,117

(22) Filed: Jan. 2, 2007

(51) Int. Cl.
*B60S 1/38* (2006.01)
(52) U.S. Cl. ............ 15/250.06; 15/250.44; 15/250.451; 15/250.48; 219/202
(58) Field of Classification Search . 15/250.06–250.09, 15/250.48, 250.44, 250.451, 250.361; 219/202, 219/203
See application file for complete search history.

(56) References Cited

U.S. PATENT DOCUMENTS

| | | | |
|---|---|---|---|
| 3,419,932 A | * | 1/1969 | Linker ...................... 15/250.06 |
| 3,639,938 A | * | 2/1972 | Golden ..................... 15/250.06 |
| 5,539,951 A | | 7/1996 | Guell et al. |
| 5,655,251 A | * | 8/1997 | Dileo et al. ............... 15/250.07 |
| 5,791,010 A | | 8/1998 | Brady et al. |
| 6,236,019 B1 | * | 5/2001 | Piccione et al. ............. 219/203 |
| 6,591,443 B1 | | 7/2003 | Gilpin |

FOREIGN PATENT DOCUMENTS

JP 64-49571 * 3/1988

* cited by examiner

*Primary Examiner*—Gary K Graham
(74) *Attorney, Agent, or Firm*—Crossley Patent Law; Mark A. Crossley

(57) ABSTRACT

A heated windshield wiper apparatus with replaceable blade is disclosed. The blade is fitted with a plurality of individual heating elements, each element disposed proximal to the apex of the blade. Apex blade heating provides not only increased flexibility for the blade in inclement weather, but also windshield warming. Apex heat also provides for the rapid release of wipers frozen to a windshield. The plurality of electrical contacts for the blade insures substantial apparatus function even with the loss of one or even a few of the heating elements or contacts. Blade removal and replacement is provided for by the contact connections of blade to slide.

16 Claims, 3 Drawing Sheets

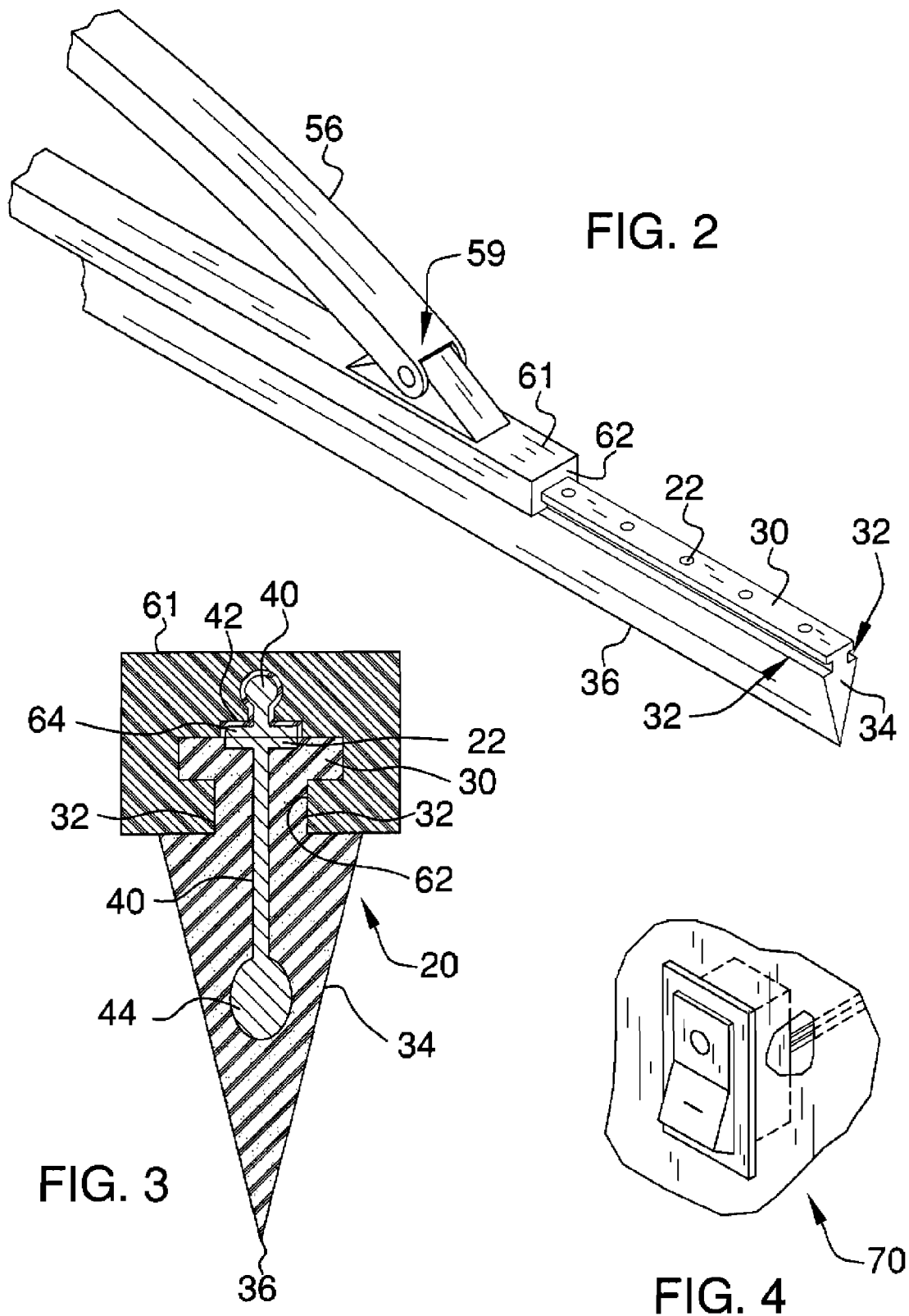

HEATED WINDSHIELD WIPER APPARATUS

BACKGROUND OF THE INVENTION

Ice covered windshields and wipers create problems for vehicle operators. Manually clearing of a windshield and wipers is time consuming. Further, practicing extended vehicle warm-up to allow an interior defroster to de-ice a windshield wastes significant fuel and time. In addition, after initial windshield cleaning, inclement conditions often cause recurrence of windshield icing. Driving conditions and time considerations do not always allow stopping for windshield de-icing, but continued driving with reduced visibility is dangerous. What is needed is a heated windshield wiper which heats as near to the blade apex as is possible in order to place the heat near blade-to-windshield contact. Heating the apex of the blade also provides for blade flexibility during cold conditions in which wiper blades typically become stiff and non-conforming to windshield surfaces. Further, heating the blade near the blade-to-windshield contact frees a blade frozen to a windshield.

Windshield wiper components, especially motors and related gearing, often fail with wiper initiation when blades are frozen to a windshield. The present heated windshield wiper apparatus addresses wiper component failures caused by blades frozen to windshield by switching on such apparatus on shortly prior to turning on the wiper movements and providing heat to the windshield and blades. The present heated windshield wiper apparatus additionally combats windshield ice retention and accumulation by heating the blade proximal to the blade apex for transfer of heat to the windshield. Further, the present apparatus allows easy replacement of only the blade, rather than requiring the replacement of the entire windshield wiper unit, while retaining the full function of the apparatus.

FIELD OF THE INVENTION

The heated windshield wiper apparatus relates to electrically heated vehicle components are more especially to a heated windshield wiper apparatus

DESCRIPTION OF THE PRIOR ART

Prior related art U.S. Pat. No. 6,591,443 issued to Gilpin on 2003, Jul. 15 teaches a heated windshield wiper which includes a heating element within the abutment element of the wiper. The abutment element of the wiper is the farther portion of the wiper from windshield contact. The wiper cannot heat the windshield as does the present apparatus, because rubber is not a good conductor of heat. Further, the wiper blade apex is therefore extremely distal from the heating element. The apex of the blade is most in need of heating for both flexibility and windshield heating, as well as for melting ice off of the windshield contact portion of the blade.

U.S. Pat. No. 5,539,951 issued to Guell et al. on 1996, Jul. 30 teaches a wiper with heated fluid dispensed from the blade. The device is far more complex than the present apparatus, and consequently, far more expensive. The device further requires connection to a fluid source, and therefore is not as conducive to retrofit as is the current apparatus.

U.S. Pat. No. 5,791,010 issued to Brady et al. on 1998, Aug. 11 teaches a wiper blade heating device which doe not directly heat the wiper blade. Further, the device does not directly contact the windshield, as does the present apparatus.

While the above-described devices fulfill their respective and particular objects and requirements, they do not describe a heated windshield wiper apparatus that provides for the advantages of the heated windshield wiper apparatus. In this respect, the heated windshield wiper apparatus substantially departs from the conventional concepts and designs of the prior art. Therefore, a need exists for an improved heated windshield wiper apparatus.

SUMMARY OF THE INVENTION

The general purpose of the heated windshield wiper apparatus, described subsequently in greater detail, is to provide a heated windshield wiper apparatus which has many novel features that result in an improved heated windshield wiper apparatus which is not anticipated, rendered obvious, suggested, or even implied by prior art, either alone or in combination thereof.

To attain this, the heated windshield wiper apparatus provides an arm with support arm and carrier bows that are typical to the industry. The fully pivoted arm/support arm/bow assembly and flexible slide of the apparatus provide the flexibility needed to conform to curved windshield surfaces. The apparatus provides an electrical switch for vehicle installation. The apparatus also provides for attachment to the vehicle defrost system such that blade heat is provided during the operation of the defrost system. The flex wiring of the apparatus travels through the arm, the support arm, and one of the carrier bows to connect to and within the slide. The flex wiring is connected to the contact strip within the slide. The flexible contact strip traverses the length of the slide. The blade is slideably and replaceably fitted to the slide, such that worn blades may be replaced as needed while retaining the full functions of the apparatus.

The heating elements within the blade are disposed proximal to the apex of the blade. As rubber and rubber-like compounds used in blade manufacture are poor conductors of heat, placement of the heating elements is key. The electrical contact to the contact strip is provided for each heating element, so that failure of any one element or contact does not negate the function of the entire blade. Placing the heating elements proximal to the apex of the blade provides for effective heating of the blade at the blade location most needing flexibility and heat. Also, the apex proximal location of the heating elements provides for heating of a windshield, a further unique element of the function of the present apparatus.

Thus has been broadly outlined the more important features of the improved heated windshield wiper apparatus so that the detailed description thereof that follows may be better understood and in order that the present contribution to the art may be better appreciated.

An object of the heated windshield wiper apparatus is to heat a wiper blade.

Another object of the heated windshield wiper apparatus is to heat a wiper blade while retaining blade flexibility.

A further object of the heated windshield wiper apparatus is to heat a wiper blade proximally to the apex of the blade.

An added object of the heated windshield wiper apparatus is to heat a windshield in contact with the blade.

Still another object of the heated windshield wiper apparatus is to provide for substantial blade heat in the event of failure of one or even a few heating elements.

And, an object of the heated windshield wiper apparatus is to provide for blade replacement.

These together with additional objects, features and advantages of the improved heated windshield wiper apparatus will be readily apparent to those of ordinary skill in the art upon reading the following detailed description of presently preferred, but nonetheless illustrative, embodiments of the improved heated windshield wiper apparatus when taken in conjunction with the accompanying drawings.

In this respect, before explaining the current embodiments of the improved heated windshield wiper apparatus in detail, it is to be understood that the heated windshield wiper apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved heated windshield wiper apparatus. It is therefore important that the claims be regarded as including such equivalent constructions insofar as they do not depart from the spirit and scope of the heated windshield wiper apparatus. It is also to be understood that the phraseology and terminology employed herein are for purposes of description and should not be regarded as limiting.

BRIEF DESCRIPTION OF THE DRAWINGS

FIG. 2 is a perspective view of the blade slideably fitting the slide.
FIG. 3 is cross sectional view of FIG. 1.
FIG. 4 is perspective view of the switch.

DETAILED DESCRIPTION OF THE DRAWINGS

With reference now to the drawings, and in particular FIGS. 1 through 6 thereof, the principles and concepts of the heated windshield wiper apparatus generally designated by the reference number 10 will be described.

Figure 1:
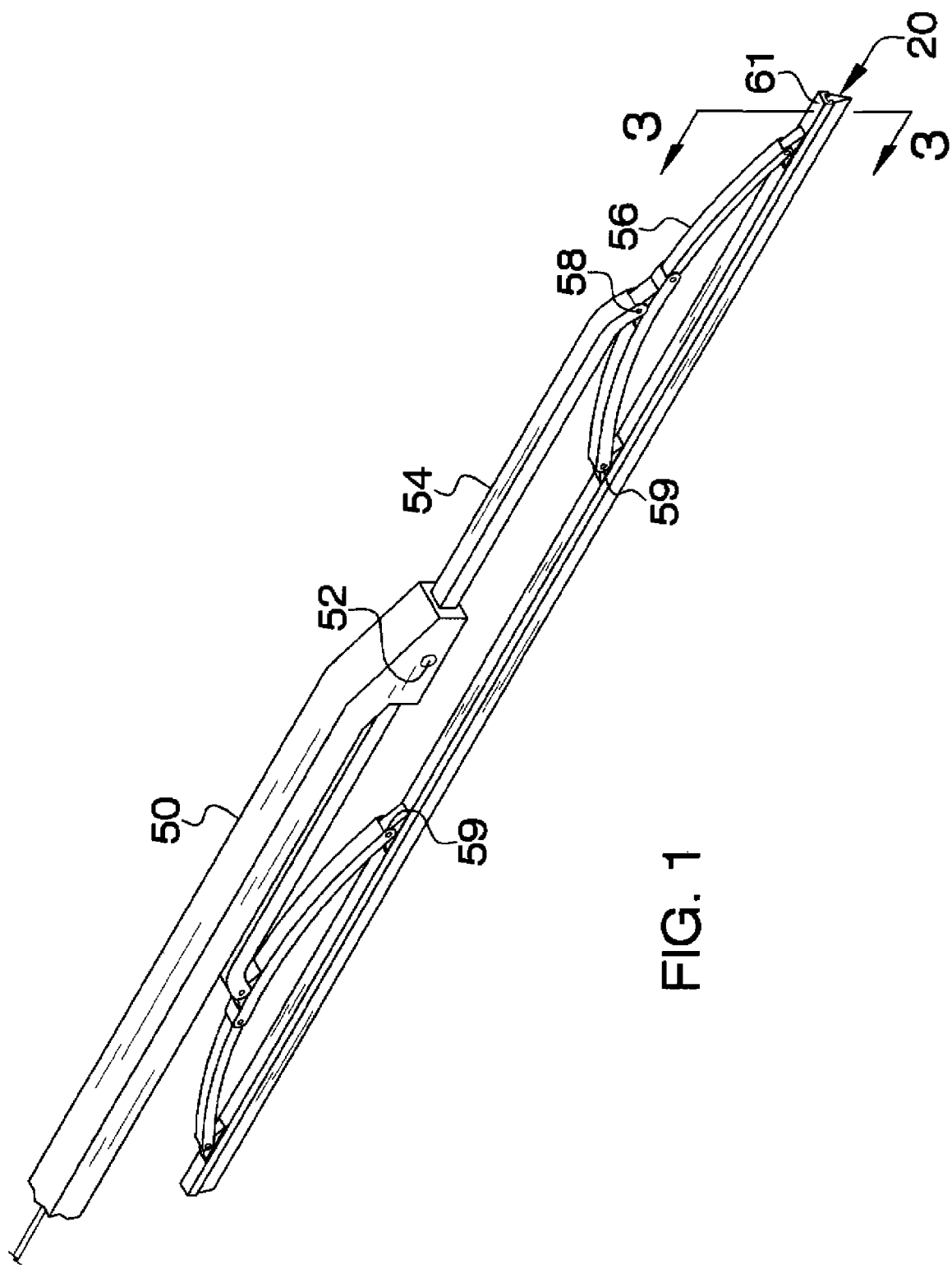
FIG. 1 is a perspective view.

Referring to FIG. 1, the heated windshield wiper apparatus 10 for removable fit to a vehicle comprises a wiper arm 50 for fit to the vehicle. The support arm 54 is pivotally connected to the wiper arm 50 via the main pivot 52. A secondary pivot 58 is disposed on each opposite end of the support arm 54. The pair of spaced apart carrier bows 56 connects to the support arm 54. Each carrier bow 56 is pivotally connected to one of the secondary pivots 58 of the support arm 54. A tertiary pivot 59 is disposed on each end of each carrier bow 56. The flexible slide 61 is connected to the tertiary pivots 59 of the carrier bows 56. The flexible blade 20 is removably connected to the slide 61.

Referring to FIGS. 2 and 3, the slide 61 contact strip 64 is disposed within the length of the slide 61. The contact strip 64 is connected to the flex wiring 40. The flex wiring 40 is provided with insulation 42, as is the contact strip 64, thereby shielding the flex wiring 40 and the contact strip 64 from electrical contact with the slide 61. The slide engagement 62 is disposed on the slide 61. The flexible blade 20 is fitted to the slide 61 via the blade 20 engagement groove 32. The engagement groove 32 is seamlessly affixed to the backbone 30. The engagement groove 32 slideably and removably fits to the slide engagement 62. The resultant fit of the blade 20 to the slide 61 provides for blade 20 removal as desired. The blade 20 is comprised of a backbone 30. The plurality of equidistantly spaced apart blade contacts 22 is disposed within the backbone 30. Each blade contact 22 is thereby in communication with the contact strip 64 of the slide 61. The blade 20 is further comprised of the triangular body 34, the base of the triangle seamlessly affixed to the engagement groove 32. The apex 36 is disposed on the triangular body 34, the apex opposite the body 34 base. The plurality of equally spaced apart heating elements 44 is disposed within the blade 20. Each heating element 44 is in communication with a blade contact 22 via flex wiring 40 within the blade 20. Each heating element 44 is disposed proximal to the apex 36 of the blade 20.

Figure 6:
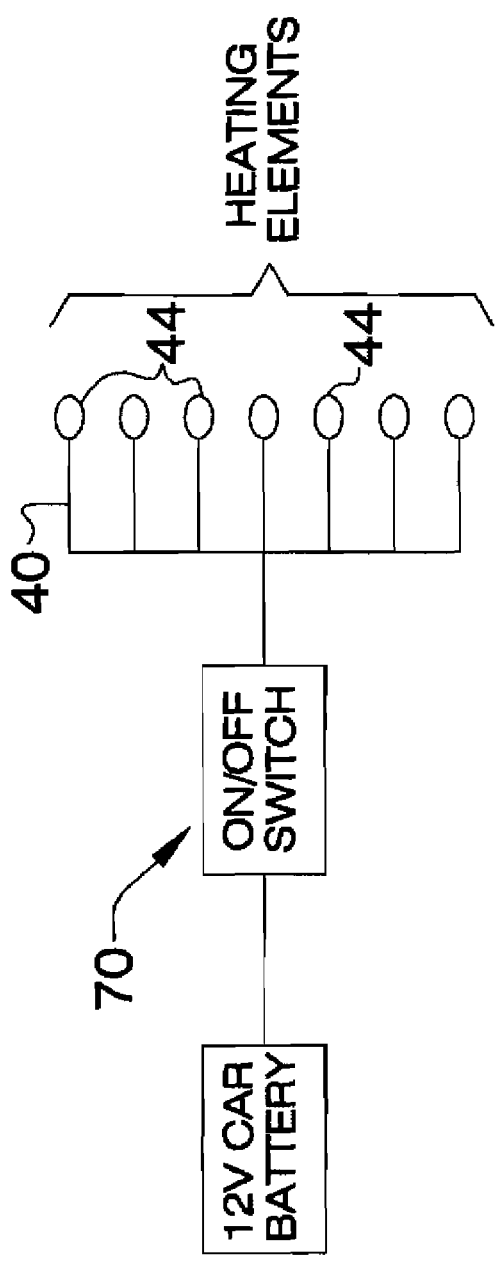
FIG. 6 is an electrical block diagram of the apparatus.

Referring to FIG. 6, the flex wiring 40 joins to an electrical power source of the vehicle. An exemplary installation joins the flex wiring 40 to the vehicle batter via the switch 70, thereby affording switched control of the apparatus 10. The opposite end of the flex wiring 40 terminates at the contact strip 64 within the slide 61. Another installation embodiment of the apparatus 10 provides electrical connection of the flex wiring 40 to the defrost control of the vehicle, thereby activating wiper apparatus 10 heat with activation of the defrost mechanism.

Figure 5:
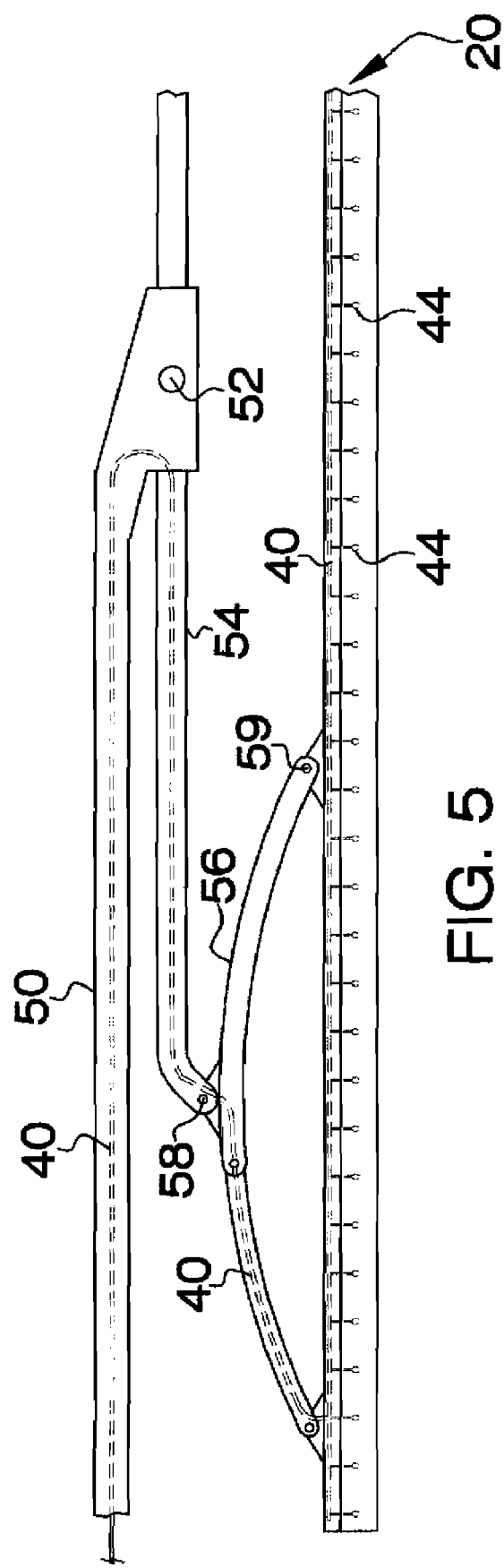
FIG. 5 is a lateral elevation view the apparatus.

Referring to FIG. 5, the flex wiring 40 for connection to the vehicle further comprises flex wiring from the slide 61 through one carrier bow 56. The flex wiring 40 thence passes through a one side of the support arm 54. The flex wiring 4 thence passes through the wiper arm 50 to continue to connect to the vehicle as disclosed above.

With respect to the above description then, it is to be realized that the optimum dimensional relationships for the parts of the heated windshield wiper apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the heated windshield wiper apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the heated windshield wiper apparatus may be used.

Therefore, the foregoing is considered as illustrative only of the principles of the heated windshield wiper apparatus. Further, since numerous modifications and changes will readily occur to those skilled in the art, it is not desired to limit the heated windshield wiper apparatus to the exact construction and operation shown and described, and accordingly, all suitable modifications and equivalents may be resorted to, falling within the scope of the heated windshield wiper apparatus.

What is claimed is:
1. A heated windshield wiper apparatus for removable fit to a vehicle, comprising:
   a wiper arm for fit to the vehicle;
   a support arm pivotally connected to the wiper arm;
   a pivot on an each end of the support arm;
   a pair of spaced apart carrier bows, each carrier bow pivotally connected to one of the pivots of the support arm;
   a pivot on an each end of the carrier bows;
   a flexible slide connected to the pivots of the carrier bows;
   flex wiring for connection to the vehicle, the flex wiring terminated within the slide;
   a slide engagement on a one side of the slide;
   a flexible blade removably fitted to the slide, the blade comprising:
      a backbone;
      an engagement groove seamlessly affixed to the backbone, the engagement groove slideably and removably fitted to the slide engagement of the slide;
      a triangular body, a base of the triangle seamlessly affixed to the engagement groove;

an apex disposed on the triangular body, the apex opposite the base of the body;

an electrical connection from the backbone to the flex wiring within the slide;

a plurality of equally spaced apart heating elements disposed within the blade, the heating elements in communication with the electrical connection, each heating element disposed proximal to the apex of the blade;

a joining of the flex wiring to an electrical power source of the vehicle.

2. The apparatus in claim 1 wherein the joining to the electrical power source of the vehicle further comprises a switch.

3. The apparatus in claim 2 wherein the joining to the electrical power source of the vehicle is disposed at a defrost control of the vehicle.

4. The apparatus in claim 3 wherein the flex wiring for connection to the vehicle further comprises flex wiring from the slide through one carrier bow, thence through a one side of the support arm, thence through the wiper arm.

5. The apparatus in claim 2 wherein the flex wiring for connection to the vehicle further comprises flex wiring from the slide through one carrier bow, thence through a one side of the support arm, thence through the wiper arm.

6. The apparatus in claim 1 wherein the joining to the electrical power source of the vehicle is disposed at a defrost control for the vehicle.

7. The apparatus in claim 6 wherein the flex wiring for connection to the vehicle further comprises flex wiring from the slide through one carrier bow, thence through a one side of the support arm, thence through the wiper arm.

8. The apparatus in claim 1 wherein the flex wiring for connection to the vehicle further comprises flex wiring from the slide through one carrier bow, thence through a one side of the support arm, thence through the wiper arm.

9. A heated windshield wiper apparatus for removable fit to a vehicle, comprising:

a wiper arm for fit to the vehicle;

a support arm pivotally connected to the wiper arm;

a pivot on each of an opposite end of the support arm;

a pair of spaced apart carrier bows, each carrier bow pivotally connected to one of the pivots of the support arm;

a pivot on an each end of the carrier bows;

a flexible slide connected to the pivots of the carrier bows;

flex wiring for connection to the vehicle, the flex wiring terminated on a one end within the slide;

a slide contact strip disposed within a length of the slide, the contact strip connected to the flex wiring;

a slide engagement on the slide;

a flexible blade fitted to the slide, the blade comprising:
   a backbone;
   a plurality of equidistantly spaced apart blade contacts within the backbone, each blade contact in communication with the contact strip of the slide;
   an engagement groove seamlessly affixed to the backbone, the engagement groove slideably and removably fitted to the slide engagement of the slide;
   a triangular body, a base of the triangle seamlessly affixed to the engagement groove;
   an apex disposed on the triangular body, the apex opposite the body base;
   a plurality of equally spaced apart heating elements disposed within the blade, each heating element in communication with a blade contact, each heating element disposed proximal to the apex of the blade;
   a joining of the flex wiring to an electrical power source of the vehicle.

10. The apparatus in claim 9 wherein the joining to the electrical power source of the vehicle further comprises a switch.

11. The apparatus in claim 10 wherein the joining to the electrical power source of the vehicle is disposed at a defrost control of the vehicle.

12. The apparatus in claim 11 wherein the flex wiring for connection to the vehicle further comprises flex wiring from the slide through one carrier bow, thence through a one side of the support arm, thence through the wiper arm.

13. The apparatus in claim 10 wherein the flex wiring for connection to the vehicle further comprises flex wiring from the slide through one carrier bow, thence through a one side of the support arm, thence through the wiper arm.

14. The apparatus in claim 9 wherein the joining to the electrical power source of the vehicle is disposed at a defrost control for the vehicle.

15. The apparatus in claim 14 wherein the flex wiring for connection to the vehicle further comprises flex wiring from the slide through one carrier bow, thence through a one side of the support arm, thence through the wiper arm.

16. The apparatus in claim 9 wherein the flex wiring for connection to the vehicle further comprises flex wiring from the slide through one carrier bow, thence through a one side of the support arm, thence through the wiper arm.

\* \* \* \* \*